Aug. 14, 1951  E. WILDHABER  2,563,896
ADJUSTABLE FRICTION DRIVE
Filed March 30, 1948  5 Sheets-Sheet 1

INVENTOR.
ERNEST WILDHABER
BY
ATTORNEY

Aug. 14, 1951　　　E. WILDHABER　　　2,563,896
ADJUSTABLE FRICTION DRIVE
Filed March 30, 1948　　　　　　　　　　5 Sheets-Sheet 2

INVENTOR.
ERNEST WILDHABER
BY
ATTORNEY

Aug. 14, 1951     E. WILDHABER     2,563,896
ADJUSTABLE FRICTION DRIVE

Filed March 30, 1948     5 Sheets-Sheet 3

INVENTOR.
ERNEST WILDHABER
BY
ATTORNEY

Aug. 14, 1951  E. WILDHABER  2,563,896
ADJUSTABLE FRICTION DRIVE
Filed March 30, 1948  5 Sheets-Sheet 4

INVENTOR.
ERNEST WILDHABER
BY
ATTORNEY

Aug. 14, 1951          E. WILDHABER          2,563,896

ADJUSTABLE FRICTION DRIVE

Filed March 30, 1948          5 Sheets-Sheet 5

INVENTOR.
ERNEST WILDHABER
BY
ATTORNEY

Patented Aug. 14, 1951

2,563,896

UNITED STATES PATENT OFFICE 2,563,896

ADJUSTABLE FRICTION DRIVE

Ernest Wildhaber, Brighton, N. Y.

Application March 30, 1948, Serial No. 18,024

31 Claims. (Cl. 74—199)

The present invention relates to friction transmissions of the adjustable type in which different speed ratios within the design limits may be obtained through relative adjustment of the members which are in frictional contact. More particularly, the invention relates to friction transmissions in which multiple discs are employed as the friction transmitting elements.

Multiple disc friction transmissions of the adjustable type have the advantage that through adjustment of the transmitting elements radially relative to one another an infinite number of ratios may be obtained within the design limits of the transmission. Changes in speed ratio are obtained by moving the shaft, which carries one set of friction discs toward or from the shaft which carries the mating set of friction discs. In known transmissions, however, the load reactions, when the discs are rotating in engagement, tend to separate the two shafts or broadly to change their relationship; and this tendency increases with increase of the load transmitted and may vary with different relative radial positions of the shafts.

In known multiple-disc friction transmissions, moreover, the pressure of frictional contact is obtained chiefly by spring means. The pressure corresponds, therefore, to the maximum load to be transmitted by the transmission and is much larger than necessary at small loads. This re-results in friction losses which are nearly as large when small loads are being transmitted as when the maximum load is being transmitted. Hence, there is a marked loss of efficiency at small loads.

Furthermore, in known friction transmissions of the multiple disc type, the contact pressure is applied either along the axis of the driver or of the driven member. In any multiple disc friction transmission, however, the contact pressure operates at the radius of driving contact. On account of the difference between the point of application of the pressure and the point of use of the pressure, then, a bending moment results in conventional transmissions on the member to which the contact pressure is applied. This causes deflections, which tend to cause the contacting surfaces of the friction discs to be disposed at an angle to each other so that full and proper surface contact, which is intended, is not attained. The contact shifts to one end of the contact profile. The discs will not wear either in such way as to provide proper contact because the deflections change with the load. Hence, with conventional construction, a large amount of crowning of the profiles of the frictional discs is required to keep the contact within the profiles; and even then the contact pressure is very much concentrated and causes rapid wear.

One object of the present invention is to provide a frictional transmission of the multiple disc type in which for any load the contact pressure applied will be substantially proportional to the transmitted load.

Another object of the invention is to provide a transmission of the character described in which such proportional contact pressure may be applied without incurring large or varying amounts of backlash with variations in the speed ratio and in which there will be a moderate and constant amount of backlash at all speed ratios for any given contact pressure.

A further object of the invention is to provide a multiple disc transmission which is so constructed that there will be no tendency for load reactions to separate the shafts which carry the mating discs or to change the position of the slide which serves to adjust the ratio of the transmission.

A further object of the invention is to provide a transmission of the character described in which the forces are balanced in all positions of this adjustable slide so that with large or small transmitted loads the forces acting on the slide are perpendicular to the ways at all positions of the slide.

Still other objects of the invention are to provide a friction transmission of the character described in which little effort is required to move the adjusting slide for adjustment of ratio even under load and in which locking of the slide in a given position presents a minimum problem so that frictional locking is quite reliable.

Another object of the present invention is to provide a frictional transmission in which the contact pressure is applied off center near the place where it is being used but in the plane of the axes of the frictional discs so as to avoid deflection and minimize wear.

A still further object of the invention is to provide a friction type transmission which will be suitable for automotive purposes and with which stepless speed changes may be effected.

A further object of the invention is to provide a frictional transmission for automotive purposes in which the pressure of frictional contact between the load-transmitting elements can be relieved at will so that the clutch required in conventional automotive transmissions can be eliminated.

Another object of the invention is to provide a frictional type transmission for automotive use having coaxial drive and driven shafts with a friction clutch disposed between the drive and driven shafts to permit effecting direct drive without driving through two sets of friction gears.

Still another object of the invention is to provide a friction transmission for automotive purposes in which the pressure of frictional contact and the contact itself between friction-transmitting members may be automatically released when a 1 to 1 ratio is approached.

A further object of the invention is to provide an automotive transmission of the character described in which the clutch which connects the coaxial drive and driven shafts is disengaged automatically when the speed ratio is changed from direct drive, and further a transmission in which the clutch is disengaged in the same operation in which pressure of the frictional contacts is relieved.

Another object of the invention is to provide a multiple disc friction transmission having means for automatically compensating for wear.

Other objects of the invention will be apparent hereinafter from the specification and from the recital of the appended claims.

Transmissions made according to the present invention are ordinarily enclosed in a casing as is customary with other transmissions. While a casing is desirable, it is not essential to the operation of my transmission and for convenience has been omitted in Figs. 1 to 5 inclusive.

Figure 1:
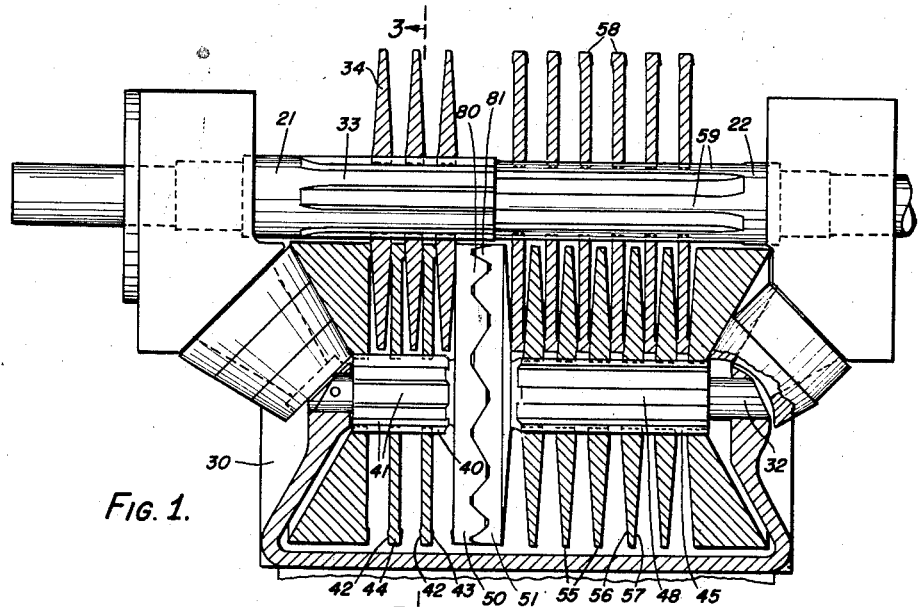
Fig. 1 is a plan view, with parts broken away and shown in axial section, of a transmission built according to one embodiment of this invention, the frictional discs being shown adjusted for the largest ratio within the design limits of the transmission.
Figure 2:
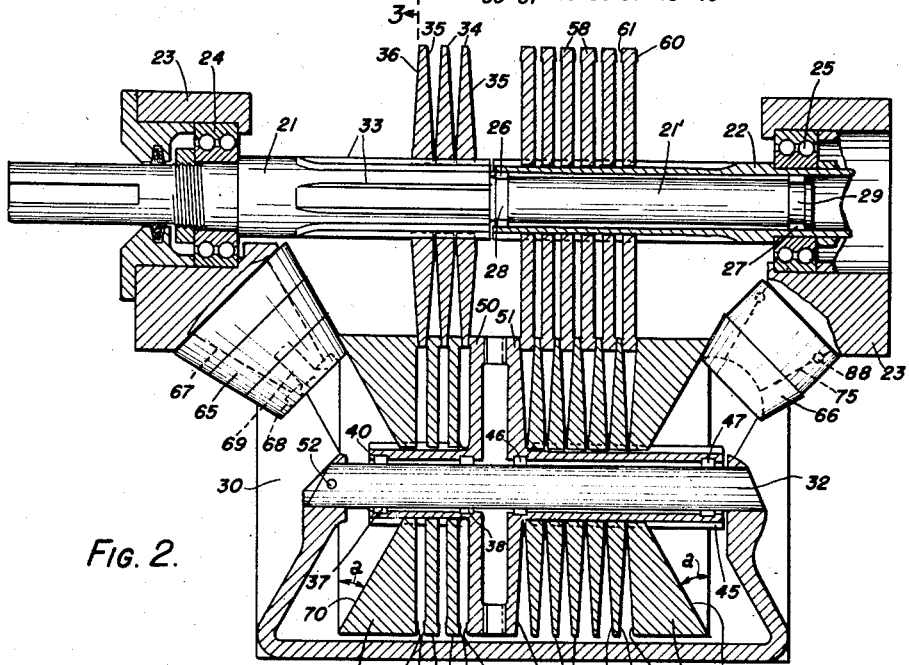
Fig. 2 is a corresponding view showing the transmission adjusted for the smallest speed ratio within the design limits of the transmission.
Figure 3:
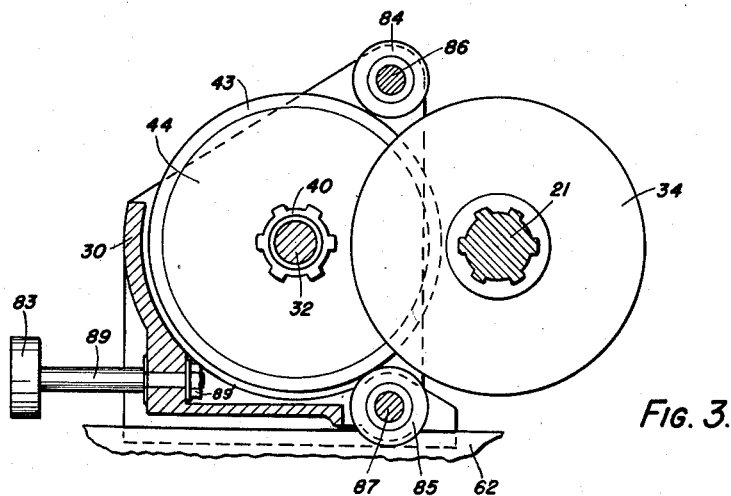
Fig. 3 is a section on the line 3—3 of Fig. 1.

Referring now to the embodiment of the invention shown in Figs. 1 to 3 inclusive, 21 denotes the high speed shaft. The low speed shaft is denoted at 22. It is mounted coaxial with the high speed shaft. The high speed shaft is ordinarily the drive shaft and has power applied to it from the outside, while the low speed shaft is ordinarily the driven shaft from which power is transmitted. It is to be understood, however, that the low speed shaft would be the drive shaft and the high speed shaft the driven shaft in a speed-up transmission. For the purposes of the present description, though, the shaft 21 will be referred to as the drive shaft and the shaft 22 as the driven shaft.

The two shafts 21 and 22 are journaled near their outer ends by means of anti-friction bearings 24 and 25 on a relatively fixed support 23; and they are journaled at adjacent ends one on the other. The shaft 22 is hollow; and the shaft 21 has a projecting portion 21' which is of reduced diameter and which projects into the hollow shaft 22. The reduced diameter section 21' of shaft 21 is journaled in the shaft 22 on cylindrical rollers 26 and 27 which roll in shallow circular grooves 28 and 29, respectively, formed in the projecting portion 21'.

Mounted on a slide 30, which is movable toward and from the shafts 21 and 22 in a direction perpendicular thereto, is a fixed counter-shaft 32. This shaft is disposed in parallelism to shafts 21 and 22.

The shaft 21 is a splined shaft provided with a plurality of external splines 33. Mounted on the shaft 21 for axial movement thereon and connected to said shaft by the splines 33 are a plurality of identical friction discs 34. Each of these discs is moderately tapered from its hub to its periphery and has opposite conical sides 35 and 36.

Journaled on spaced anti-friction bearings 37 and 38 on shaft 32 is a sleeve 40. This sleeve 40 is provided with external splines 41. The conical sides 35 and 36 of friction discs 34 engage the conical sides 42 and 43 of friction discs 44 which are connected to the sleeve 40 through the splines 41. The conical surfaces 42 and 43 of discs 44 are of relatively short profile length, as shown, and may be crowned if desired.

Journaled on the counter-shaft 32 coaxially with the sleeve 40 is a second sleeve 45. This is mounted on anti-friction bearings 46 and 47. It also is provided with external multiple splines, denoted at 48.

The two sleeves 40 and 45 are made of greatly enlarged diameter at their adjacent ends to provide mating face clutch members 50 and 51. These face clutch members have engaging teeth 80 and 81 which have helical sides as will be described further hereinafter. Clutch member 50 is formed on the face which confronts the discs 34 with a conical surface 42' of short profile length similar to the conical surfaces 42 of discs 44. This conical surface 42' is adapted to engage the conical surface 35 of the disc 34 next adjacent to clutch member 50.

The shaft 32 is secured to the slide 30 against rotation relative thereto as, for instance, by means of pin 52. The sleeves 40 and 45 rotate on the shaft and the bearings 37, 38, 46, and 47 also permit of axial movement of the sleeves on the shaft.

Mounted upon the sleeve 45 and connected thereto through the splines 48 are a set of friction discs 55. Each of these discs is moderately tapered from its hub to its periphery and has conical side surfaces 56 and 57 at opposite sides. The discs 55 are adapted to engage and mate with discs 58 which are connected to hollow shaft 22 through the external splines 59 that are provided on said hollow shaft. The discs 58 have conical surfaces 60 and 61 at opposite sides thereof which engage the conical surfaces 56 and 57, respectively, of the discs 55. The surfaces 60 and 61 are, however, of relatively short profile length and may be crowned.

Discs 58 are similar in shape to the discs 44 while the discs 55 are similar in shape to discs 34. The face of the clutch member 51 opposite that on which the clutch teeth are provided is formed with a conical surface 57' similar to the conical surfaces 57 of the discs 55 and adapted to cooperate with the adjacent conical surface 61 of the adjacent disc 58.

Obviously, when the shaft 21 is rotated, the sleeve 40 is driven through the friction discs 34 and 44 and drives the sleeve 45 through the face clutch members 50 and 51, and the sleeve 45 in turn drives the shaft 22 through the friction discs 55 and 58. The speed ratio is adjusted by adjusting the slide 30 on support 62 (Fig. 3). To reduce the speed of the driven shaft 22, as compared with the speed of the drive shaft 21, slide 30 is adjusted toward shafts 21 and 22. Fig. 1 shows the slide 24 in the innermost position compatible with the design limits. The frictional contact between the discs 34 and 44 is then close to the axis of the drive shaft 21 so that sleeve 40 is rotated at a slower speed than the drive shaft 21. The frictional contact between the discs 55 and 58 is also close to the axis of the sleeve 45 so that the speed of driven shaft 22 is still smaller than that of sleeve 45. Hence, with the slide 30 adjusted to the position shown in Fig. 1, the speed of shaft 22 is considerably reduced as compared with the speed of shaft 21.

In Fig. 2, the slide 30 is adjusted to the outermost position permitted by the design. With the dimensions shown, this position is a 1 to 1 speed ratio, that is, the drive shaft 21 and driven shaft 22 rotate at about the same speed. Here discs 34 and 44 and discs 55 and 58 contact at their extremities. If desired, a speed-up could be achieved in the position of the slide 30 of Fig. 2 by using smaller discs 44 and 58 and larger discs 34 and 55.

As is evident from Figs. 1 and 2, displacement of slide 30 must be accompanied by an axial displacement of the several friction discs in order to keep the mating discs in contact. An outward displacement of slide 30, that is, an increase of the center distances of the mating discs requires an approach of the discs as is seen from Fig. 2, while a decrease of the center distances calls for separation of the discs as will be seen from Fig. 1.

To effect axial displacement of the discs simultaneously with the movement of the slide 30, two conical pressure rollers 65 and 66 are provided. These are mounted at opposite ends of shaft 32.

The roller 65 may be composed of three separate rollers having the same cone angle, as shown. Its axis lies in the plane of the axes of shafts 21, 22 and 32 and is inclined to the axes of these shafts. It is rotatably mounted upon a fixed conical arbor 67. Roller 65 is adapted to engage an internal conical surface 70 provided on an end member 71 which is mounted on the sleeve 40 and connected thereto through the splines 41 of the sleeve. This end member 71 has on its opposite end face a conical friction surface 43 which is adapted to engage and mesh with the conical surface 36 of the adjacent friction disc 34.

Roller 66 is mounted on a conical arbor 75 which may be integral with or secured to the support 23. Like the conical roller 65, the axis of conical roller 66 lies in the plane of the axes of the shafts 21, 22 and 32, and is inclined at an acute angle to shaft 32. Conical roller 66 engages an internal conical surface 76 formed on an end member 77. This end member is mounted on sleeve 45 and connected thereto through the splines 48 of that sleeve. The end member 77 is formed on the side opposite side 76 with an external conical surface 56', similar to the conical surface 56 of the discs 55, which is adapted to cooperate with conical surface 60 of the adjacent friction disc 58.

Roller 66 is opposite the pressure zone between discs 55 and 58. This pressure zone always stays in the same place and does not shift radially. A single roller 66 is, therefore, sufficient for end member 77. The stationary tapered journal 75 for this roller takes up the radial load as well as the outward thrust. There is no inward thrust in operation. Balls 88 engage concentric grooves on the roller and the journal and prevent the roller from ever working itself loose inwardly.

Roller 65 is composed of a plurality of coaxial rolling cones capable of turning independently of each other. This is to give a minimum amount of sliding. These rolling cones are mounted on a tapered stationary journal 67 and are held against inward displacement by a disc 68 which is rigidly secured to the journal by the screw 69. This disc bears against the innermost of the cones of roller 65.

The inclination $a$ of the profiles 70 and 76 of the two end members 71 and 77 to a plane of rotation is preferably equal on the two end members and is computed to give the proper axial displacement of the discs when the center distance of the shafts is changed. Let $b$ denote the inclination or mean inclination of the profiles of the friction discs to their planes of rotation. This is preferably made the same on all of the friction discs. Let N denote the number of contacts between the friction discs. Then inclination $a$ of the profile of the two end discs should fulfill the equation:

$$\tan a = \tfrac{1}{2} N \cdot \tan b$$

as can readily be demonstrated.

When the inclination $a$ is so determined, the discs will stay equally in contact at all center distances, that is, at all positions of slide 30.

In the transmission of the present invention the axial pressure between the friction discs, instead of being created by springs, is created, or at least most of it is created, by the pair of engaging toothed clutch members 50 and 51 which form part of the sleeves 40 and 45. The mating teeth 80 and 81 of these two clutch members have helical side surfaces of equal inclination on both sides. The lead of the helical surfaces L is the same but of opposite hand on the two sides of the teeth. The torque transmitted between the two sleeve members 40 and 45 causes the clutch members 50 and 51 to be pressed away from each other. They thereby hold the friction discs in engagement under pressure. If desired, a light spring might be interposed between the two clutch members 50 and 51 to keep the friction discs under a light pressure at all times.

Lead L is computed to give a large enough axial pressure for the torque to be safely transmitted but to be not more than necessary to provide the safety factor. Excess pressure causes excess friction and loss of efficiency.

Let P denote the axial pressure, which is substantially equal to the normal pressure, let $m$ denote the coefficient of friction, $n$ the number of contacts on the discs carried by sleeve member 40, R be the mean radius of the contact bands of the discs 44. The maximum torque transmitted is then: $m \cdot P \cdot n \cdot R$. One half of this amount may represent the torque which can safely be transmitted without undue slippage. This torque $\tfrac{1}{2} m \cdot P \cdot n \cdot R$, which is transmitted through the clutch teeth, should produce an axial pressure of P. From this requirement the equation may be derived:

$$L \cdot P = 2\pi(\tfrac{1}{2} m \cdot P \cdot n \cdot R)$$
Hence: $L = \pi \cdot m \cdot n \cdot R$ With this arrangement the axial pressure is proportional to the torque transmitted and is sufficiently large to carry the load.

The friction discs 55 transmit the same torque to their mating friction discs 58 at a radius R' from their axis. This radius is smaller than radius R in the setting of Fig. 1. It is equal to R in the setting of Fig. 2. At all intermediate positions it is smaller than R. More tangential load is, therefore, required to transmit a given torque at radius R' than at radius R. It takes R/R' times as much tangential load at radius R' than at radius R. To carry this increased load, I use an increased number of discs in set 55 over those used in set 44. That is, there are more discs 55 of long working profile on the countershaft than there are discs 44 of short working profile.

Slide 30 may be adjusted to move the countershaft in the plane of the parallel axes by any suitable known means, for instance, by a fluid-pressure actuated piston 83 such as shown in Fig. 3. This piston is adapted to reciprocate in a cylinder (not shown) and is connected with slide 30 by piston rod 89 and not 89'.

If desired, additional guidance and support may be provided for the end members 71 and 77 by providing rollers 84 and 85. These are mounted on parallel shafts 86 and 87 that are secured in slide 30. These rollers as well as the pressure rollers 65 and 66 may be provided with anti-friction bearings if desired. However, plain bearings are shown in Figs. 1 to 5 inclusive.

In this embodiment of the invention, the forces acting on slide 30 are balanced. There is no tendency to push the slide one way or the other. The contact pressure acting on the tapered friction discs results in a force tending to separate the two axes of rotation. This force is balanced by the reaction from the pressure rollers 65 and 66. Their pressure applied to the internal conical surfaces 70 and 76 of the end members would normally tend to cause the axes of rotation to approach. However, with the construction shown, these opposite forces are exactly balanced as will readily be understood.

Figure 4:
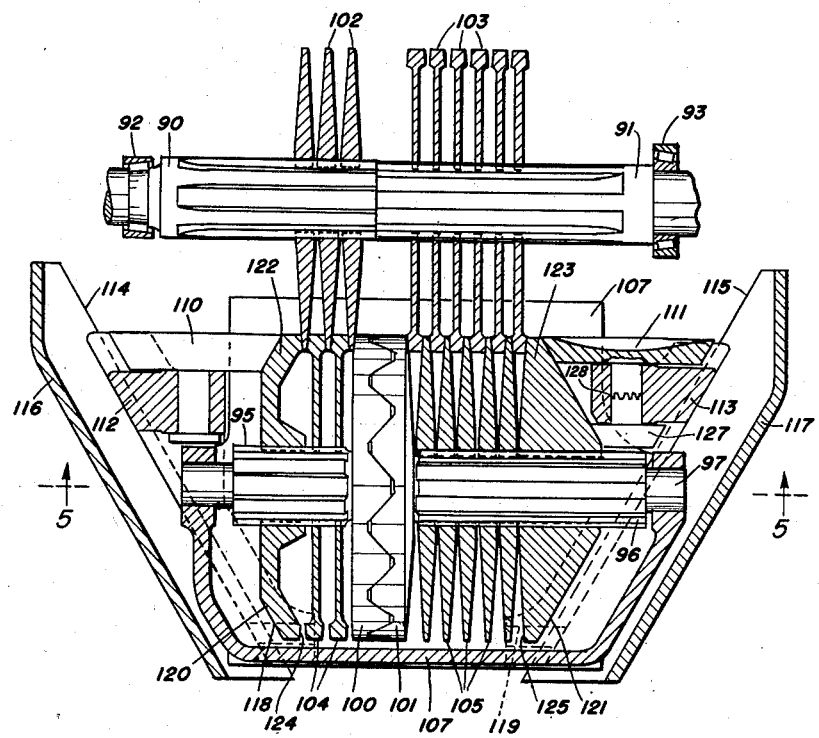
Fig. 4 is a part plan view, part axial sectional view illustrating somewhat diagrammatically another embodiment of the present invention.
Figure 5:
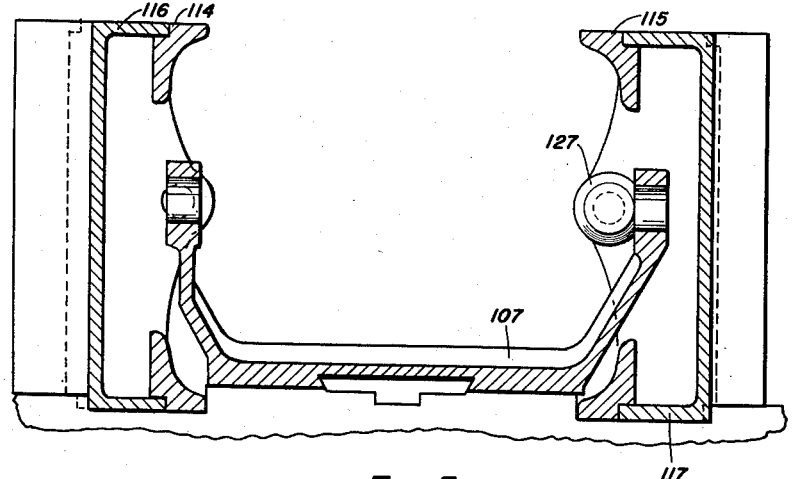
Fig. 5 is a section on the line 5—5 of Fig. 4.
Figure 7:
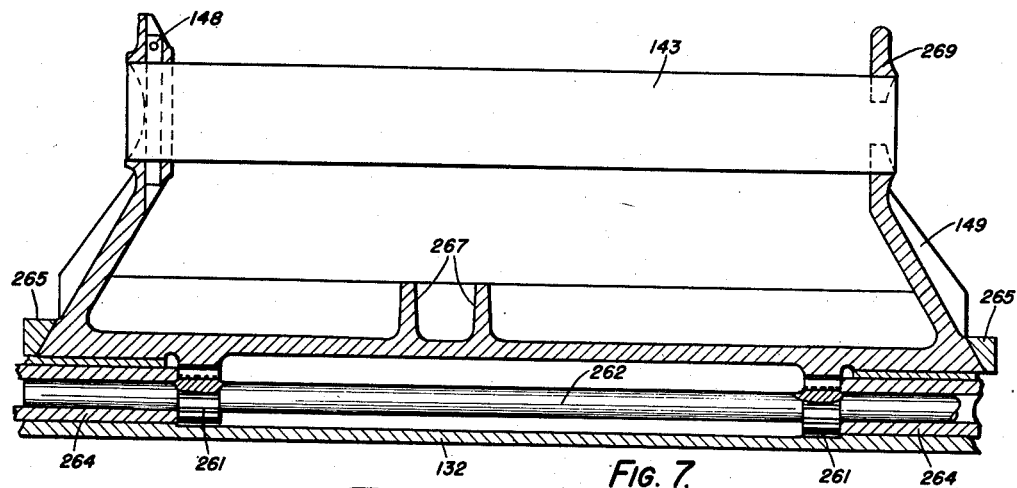
Fig. 7 is a partial sectional view taken on the line 7—7 of Fig. 6.
Figure 12:
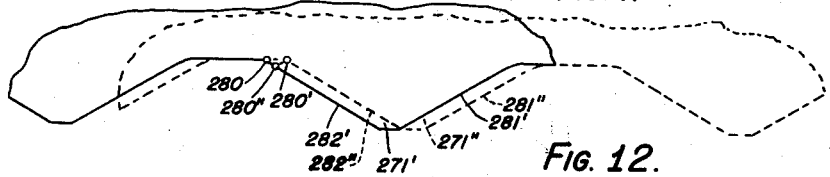
Figs. 12 and 13 are diagrams explanatory of the wear adjustment possible in a transmission made according to the present invention.

In the modification of the invention shown in Figs. 4 and 5, the drive shaft 90 and driven shaft 91 are arranged coaxially and are mounted upon spaced anti-friction bearings 92 and 93 and within one another as in the embodiment of Figs. 1 to 3, inclusive. As in the embodiment of these figures, also, the counter-shaft comprises two sleeve members 95 and 96 which are journaled on a fixed shaft or bar 97 and which are operatively connected together by face clutch members 100 and 101 that have teeth with helical tooth sides. The shafts 90 and 91, and the sleeves 95 and 96 carry friction discs 102, 103, 104, and 105, respectively. These friction discs are shaped and mounted like the friction discs 34, 58, 44, and 55, respectively, of the embodiment of Figs. 1 to 3.

The difference between the embodiment of Fig. 4 and the modification of Figs. 1 to 3 inclusive lies in the pressure rollers. In the embodiment of Figs. 4 and 5, pressure rollers 110 and 111 are used. These are not mounted on stationary axes but are journaled on slides 112 and 113, respectively, which are movable in directions inclined to the axes of shafts 90, 91 and 97. They slide along guide surfaces 114 and 115, respectively, which are inclined to the axis of shaft 97 and which are provided on fixed supports 116 and 117. The slides 112 and 113 have straight slots 118 and 119 at one end which are parallel to the shaft 97. These slots are engaged by projections (not shown) of slide 107. Through these connections, the slides 112 and 113 are moved along guides 114 and 115, respectively, when slide 107 is moved toward or from the shafts 90 and 91. In this way the radial component of travel of the slides 112 and 113 is equal to the radial displacement of slide 107. The radial component combines with the axial component of travel to give the desired resultant displacement along the inclined guides. The inclination of the guides 112 and 113 to the axis of shaft 97 is equal to angle $a$ determined as above set forth.

In this embodiment of the invention, the pressure rollers 110 and 111 engage convex conical end surfaces 120 and 121, respectively, formed, respectively, on the end face of each of two end members 122 and 123, that are connected through splines to sleeves 95 and 96, respectively. The rollers are always aligned with the end members since they participate in the radial displacement of the end members. As before, the opposite faces of the end members are conical surfaces, denoted at 124 and 125, respectively, which cooperate with the adjacent conical surfaces of friction discs 102 and 103.

Roller 111 has preferably connected to it a second roller 127 which also engages conical surface 121 of end member 123. The two rollers may be coupled together by a face clutch 128.

With the construction shown in Fig. 4, pure rolling is obtained between the rollers 110, 111, and 127 and the respective end members 122 and 123. In this embodiment of the invention, as in the embodiment previously described, the separating forces of the friction discs are balanced by the reactions from the inclined guides 114 and 115 which act on slide 107 through slides 112 and 113, the pressure rollers 110, 111 and 127, and the slots 118 and 119.

I shall now describe the embodiment of my invention shown in Figs. 6 to 15 inclusive which represents specifically a transmission adapted for automotive use. In this embodiment of the invention, stationary pressure rollers are employed as in the embodiment of Figs. 1 to 3. Indeed, the modification of the invention shown in Figs. 1 to 3 inclusive can be considered as a simplified form of the automotive transmission. The automotive transmission, however, embodies several important features not found in the modification of Figs. 1 to 3 inclusive although these features are not necessarily confined to use in automotive transmissions. Among these additional features are the provision of means for releasing the pressure of frictional engagement as by axial displacement of one of the pressure rollers, the provision of means for taking up wear of the friction surfaces and for automatic wear adjustment, the provision of a clutch between the drive and driven shafts to permit of direct drive, the provision of means for operating this clutch in two ways, the provision of means for keeping the slide in alignment, and the provision of gear means for reversing the motion of the driven shaft.

In the embodiment of the invention shown in Figs. 6 to 15 inclusive, 130 and 131 denote the drive and driven shafts, respectively. They are again arranged coaxially. In this embodiment of the invention, the transmission is mounted in a casing 132. The drive shaft 130 is journaled on anti-friction bearings 134 in this casing, while the driven shaft 131 is journaled on an anti-friction bearing 135 in this casing. The driven shaft 131 is tubular and has at one end an integral bevel gear 170. The drive shaft 130 is formed with an extension which is journaled in the shaft 131 on anti-friction bearings 172 and 173.

Mounted on the drive shaft 130 and connected thereto through the splines 136 of that shaft are a plurality of friction discs 137. These engage friction discs 138 that are mounted upon a splined sleeve member 140. The sleeve member 140 is journaled through anti-friction bearings 141 and 142 on a stationary shaft 143. A second sleeve member 145 is also mounted on this shaft to be coaxial with the sleeve member 140, being journaled on the shaft through the cylindrical anti-friction bearings 146 and 147. The shaft 147 is stationary and is secured by pins 148 to slide 149.

The two sleeve members 140 and 145 are connected by toothed face clutch members later to be described. Mounted on the splines of sleeve 145 is a set of tapered friction discs 154. These engage mating friction discs 155 which are connected to the driven shaft 131 through the splines of that shaft.

The tapered friction discs 137 have conical operating surfaces 160 and 161 at opposite sides to engage the short length conical operating surfaces 162 and 163 of discs 138. Discs 137 are thinned down near their peripheries as indicated at 157. The operating portions of friction discs 138 lie adjacent the peripheries of the discs only as denoted at 158 and are thinned down between their peripheries and the hub of sleeve member 140.

When the slide 149 is adjusted away from the axis of the drive and driven shafts to produce a 1 to 1 ratio, the operating portions 158 of the discs 138 are opposite the thinned down portions 157 of the discs 137 and frictional contact ceases, therefore, between discs 137 and 138. When frictional contact ceases at 1 to 1 ratio, no pressure is possible on any of the discs. This condition is assured by a stop to be described which limits the axial displacement of the two sleeve members 140 and 145 away from each other. Discs 137 are thinned down rather than cut off at their outside so that they are always kept between their proper mating discs 138. These discs are slightly chamfered at their peripheries as indicated at 164 and 165 so that they are capable of pushing the discs 137 axially away from them when radially approached to them. The chamfers match the inclination of the portions 166 and 167 of the profiles of discs 137 which connect the thinned down portions 157 of these discs with the main portions of the discs. The friction discs 154 have conical surfaces 222 and 223 at opposite sides which converge towards the peripheries of the discs. The discs 155 have conical surfaces 224 and 225 at opposite sides which are of short profile length. They also converge toward the peripheries of the discs, but the discs are relieved between these surfaces and the shaft 131.

For direct drive, the drive and driven shafts 130 and 131 are adapted to be connected by a friction clutch denoted as a whole at 175. This clutch has a part 176 which is secured by screws 177 to a flange 178 of drive shaft 130. This part 176 is of relatively large diameter as compared with the diameter of shaft 130 and acts, therefore, as a fly wheel. This can take the place of the fly wheel which is provided in conventional transmissions between the engine and the drive shaft, because with the construction of the present invention no clutch needs to precede the drive shaft.

The clutch 175 shown is of the multiple disc type. It comprises alternate discs 180 and 181. Discs 180 are connected by splines with the driven shaft 131. Discs 181 are connected to the member 176 by internal splines formed on that member. Pressure is applied between the discs 180 and 181 by a spring 182 which is here shown as a spring of the Belleville type and which acts between a ring 185 and the end plate 198 of the clutch. End plate 198 is secured to part 176 by screws 199. Levers 183 serve to operate the clutch. One end of each lever is pivoted on a sliding sleeve 184 which is adapted to slide on shaft 131. Axial displacement of this sleeve to the left in Fig. 6 releases the clutch. The portion of each lever furthest away from the axis of rotation bears against the flange of ring 185 which is movable along the internal splines of the part 176. Each lever fulcrums on cover 198. This is all conventional structure and need not be described further. In the position shown, the clutch is disengaged and the ring 185 is pressed back to the right against the resistance of spring 182 so that the spring pressure is taken off the friction discs 180 and 181.

Displacement of the sleeve 184 to the right restores the spring pressure on the discs 180 and 181 and engages the clutch. The sleeve 184 is adapted to be shifted by a lever 187 which is pivotally mounted upon a pin 188 mounted in casing 132. This lever is adapted to be operated in two ways, automatically or manually.

For automatic operation, a roller or rider 189 is rigidly connected with it just below the axis of the drive and driven shafts. This roller is adapted to contact against and ride on a cam path 190 provided on an extension of slide 149. Contact of the roller 189 with the cam path is assured through the pressure of clutch spring 182 acting through clutch levers 183. Path 190 is so farmed that the clutch is kept disengaged until slide 149 has been moved to a position to give a speed ratio approaching 1 to 1. By then the roller 189 is opposite the sloped portion of path 190 which allows the roller to slide to the right thereby gradually disengaging the clutch.

For manual operation, a lever 192 is provided. This lever is keyed to a shaft 193 which is journaled in the casing 132. It is connected to lever 187 by a link-rod 194 which is pivotally connected at one end to lever 192 by a pin 195 and pivotally connected at its opposite end to lever 187 by a pin 196. The pin 196 engages in an elongated slot 197 that is provided on the free end of lever 187. When the lever 192 is moved counterclockwise, the pin 196 moves to the left in slot 197 and then turns lever 187 to released position.

Instead of the structure just described any suitable known design of friction clutch may be used to connect and disconnect shafts 130 and 131.

Pressure rollers 200 and 201 are provided at opposite ends of shaft 143 to maintain frictional engagement of the several friction discs 137, 138, 154 and 155. The pressure roller 200 is composed of a plurality of conical rollers which are mounted by means of anti-friction bearings 202 on a stationary arbor 203. The axis of this arbor is inclined to the axes of shafts 143 and 130 and intersects both axes. The arbor is secured to the casing 132 by screws 204. The rollers 200 may be held on the arbor by a disc 205 and screw 206.

The rollers 200 engage against the outside concave conical surface 207 formed on an end member 208. This end member is mounted on the sleeve 140 and connected thereto through the splines of that sleeve. The inside face of end member 208 is formed with a conical surface 163' similar to the conical surfaces 163 of friction discs 138. This conical surface is of short profile length and is adapted to cooperate with the conical surface 160 of the endmost of the friction discs 137. Roller 201 bears against an internal conical surface 220 formed on an end member 221. This end member is connected to the sleeve 145 through the splines thereof. The inside surface 222' of this end member is a conical surface similar to the conical surfaces 222 of friction discs 154 and is adapted to cooperate with the conical surface 224 of the extreme right hand member of the set of friction discs 155.

Roller 201 has an integral stem portion 209 which is journaled in anti-friction bearings 210 and 211 in a slide 215. This slide is mounted to reciprocate in ways 216 formed in casing 132. The roller 201 is adapted to be moved axially independently of the movement of slide 149 to engage or release the friction discs. The axial position of pressure roller 201 is controlled by lever 192. This lever carries a roller 217 which engages in a slot 218 formed in slide 215. It will be seen that a counterclockwise movement of lever 192 will move the slide 215 backwardly so that the pressure is taken off the friction discs and that at the same time the clutch 175 is disengaged if it has previously been engaged. It stays disengaged if already disengaged.

The reversing gear for the transmission will now be described. It is of the bevel gear type and comprises the bevel gear 170 which is integral with shaft 131, an intermediate bevel gear 230, and the bevel gear 231. The intermediate bevel gear 230 is mounted upon a shaft 232 which is journaled in the casing 132 on anti-friction bearings 233 and 234, and which extends at right angles to the axis of shaft 131. The bevel gear 231 is rotatably mounted by means of anti-friction bearings 235 and 236 upon shaft 238 which is axially aligned with shafts 130 and 131.

The shaft 238 is journaled at one end on an anti-friction bearing 239 in the hollow shaft 131 and at its opposite end on an anti-friction bearing 240 in the casing 132. Secured to the shaft 232 and threadably engaged therewith is a thrust ring 245 which has a conical surface that bears against the front ends of the teeth and the fronts of bevel gears 170 and 231. It takes up possible inward thrust of both of said bevel gears.

Mounted upon the shaft 238 for axial reciprocation thereon is a sleeve 246 which is reciprocal along splines formed on the shaft 238. This sleeve contains face clutch teeth at its opposite ends which are adapted to be engaged selectively with face clutch teeth which are integral with and which project axially from the bevel gears 170 and 231. Engagement of the member 246 with gear 170, as shown, will produce forward drive. Engagement of the member 246 with gear 231 reverses the drive. When member 246 is disengaged from both gears, the transmission is in neutral position. The member 246 may be shifted by a yoke member indicated at 248 and operated from a lever as in a conventional transmission.

For obtaining different ratios, slide 149 is adjustable along guides 249 provided in the transmission housing 132. These guides extend in a direction parallel to the plane of the axes of the transmission. The housing is split preferably on the level of the transmission axes and the two halves are rigidly secured together by means of screws and nuts, the screws passing through the holes 250.

Slide 149 may be adjusted manually or by power. For power movement a piston 255 (Fig. 8) is provided which is reciprocal in a cylinder 256 that is secured to the housing 132. Fluid pressure may be applied to opposite sides of the piston to effect movement of the slide. The piston 255 has a piston rod 257 integral with it that is fastened to the slide 149 by a nut 258.

Secured to the bottom of the slide 149 are two parallel racks 260 whose teeth are aligned with each other. These racks mesh with a pair of pinions 261 (Figs. 7 and 8) which are formed integral with a shaft 262 and which have aligned teeth. Shaft 262 is mounted in plain bearings 264 inserted in the transmission housing 132 from the outside. The mesh of the accurately aligned teeth keeps the slide 149 in proper alignment without requiring an undue pressure on the gibs 265 which retain the slide in position. The teeth of the pinions 261 may be made either straight or helical. In the latter case the teeth of the two pinions may be made of opposite hand to hold the slide laterally also.

Figure 8:
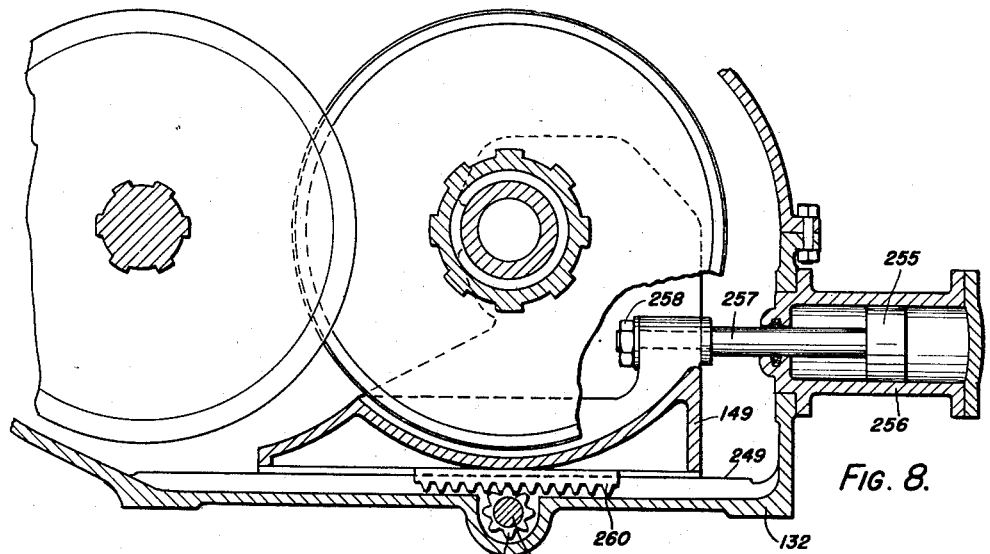
Fig. 8 is a fragmentary section view taken substantially on the line 8—8 of Fig. 6.

The slide 149 is reinforced by ribs 267 (Fig. 7) which project into a circular recess 268 (Fig. 6) provided in sleeve member 140. Shaft 143 is securely held in slide 149 in a hole at the left hand side by pin 148 (Fig. 7) and in a nearly closed fork 269 at the opposite side. The slide may be moved manually by turning shaft 262 or by power through the piston 255 (Fig. 8).

As already stated, there is formed integral with shaft 140 a clutch member 150 which is adapted to cooperate with a clutch member 151. The clutch member 151 is integral with sleeve member 145. The two clutch members are formed with mating teeth 270 and 271 (Fig. 6) whose opposite sides have helical surfaces of opposite hand and of preferably the same lead L. This lead may be determined in the manner already described.

Figure 6:
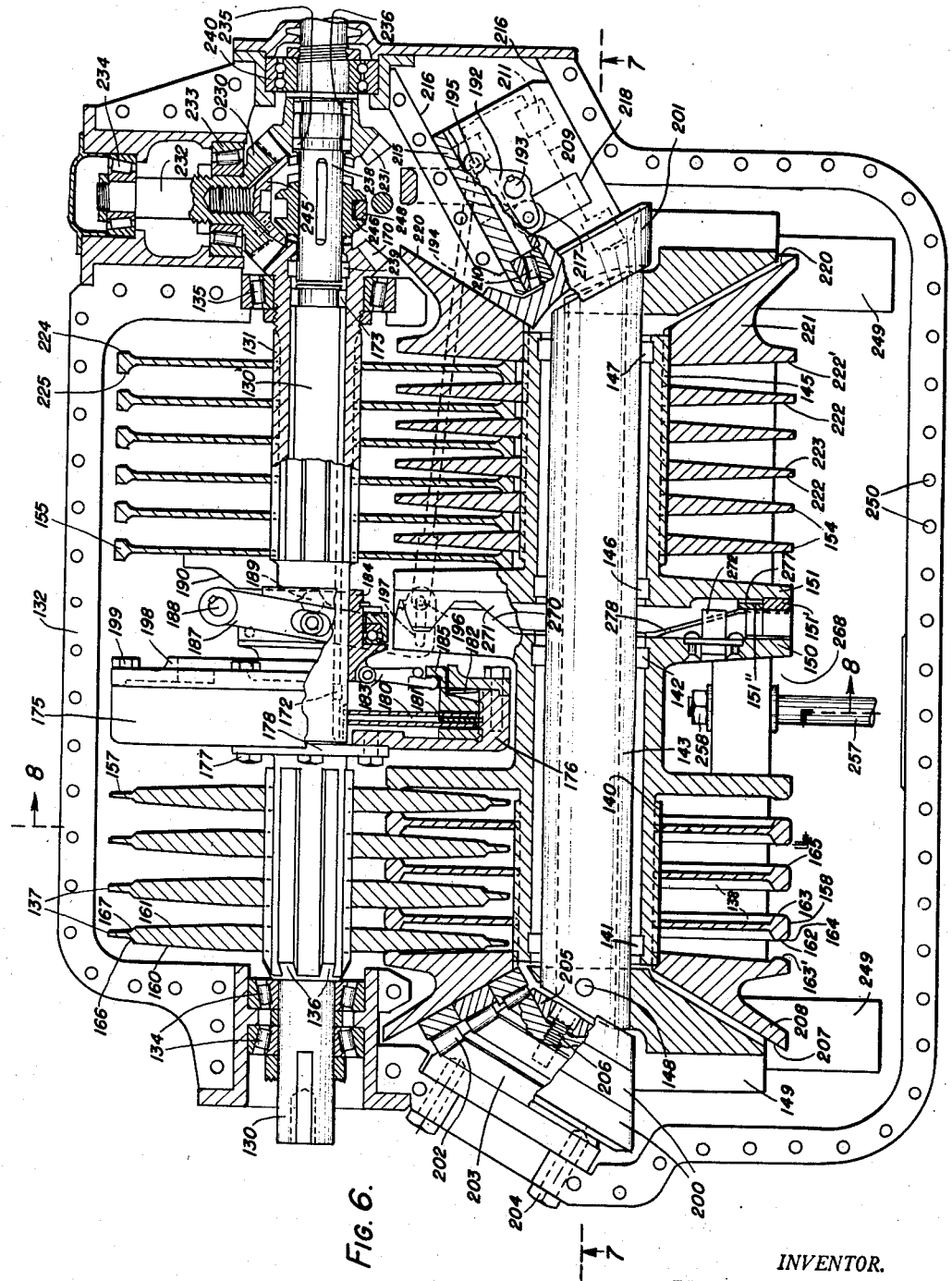
Fig. 6 is a part plan view, part axial section of an automotive transmission constructed according to a further embodiment of this invention.
Figure 9:
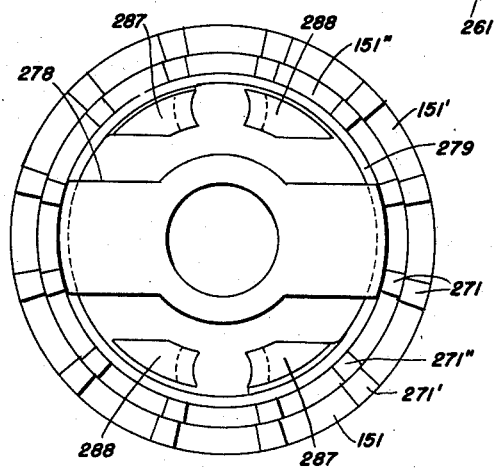
Fig. 9 is an end view showing one of the members of the helical clutch used in the transmission of Fig. 6 and its cooperating parts.

The clutch member 151 is shown in end elevation in Fig. 9. Its clutch teeth 271 are arranged in two concentric rings 151' and 151" which can be turned relative to one another. The outer ring 151' is rigidly secured to the enlarged end face of sleeve member 145. The inner ring 151" has saw teeth (not shown) which are adapted to engage and rest on saw teeth 277 provided on the enlarged end face of sleeve member 145. It is held there by a thin disc spring 278. This spring is shown in Figs. 6 and 9. It engages a flange 279 on the inside of the ring 151". Spring 278 is mounted coaxial with shaft 143 and bears at its central portion against the enlarged end face of sleeve 140.

Ring 151" can be adjusted about the axis of the sleeve member 145 after disengaging it from the saw teeth 277 against the moderate pressure of spring 278. The purpose of this adjustment is to compensate for wear of the friction discs as will now be described particularly with reference to Figs. 12 and 13.

A friction transmission is apt to have some wear when the loads are high. This wear shows up especially in a slight thinning down of discs such as discs 138 and 155, which have narrow working surfaces. This wear causes the two clutch members 150 and 151 to move away from each other axially even when only a slight torque is transmitted. In effect, the position of the two clutch members at zero torque has changed through wear of the friction discs and now corresponds to a larger axial spread of the two clutch members. This means that there will be backlash between the teeth of the two clutch members, but backlash should be kept at a minimum in an automotive transmission where the load is frequently reversed. In coasting, for instance, the car drives the motor.

Excess backlash is avoided in the present invention by adjusting the inner ring 151'' about the axis of sleeve 145. Initially the two rings 151' and 151'' have their teeth 271' and 271'' aligned with their tooth profiles coinciding at a given distance from the axis of sleeve 145. When wear of the friction discs occurs, however, inner ring 151'' can be adjusted so that the sides 281'' of its teeth 271'' are out of radial alignment with the corresponding sides of the teeth 271' of ring 151' as shown in full lines in Fig. 9 and in dotted lines in Fig. 12. Thus, a corner of the side 282'' of a tooth 271'' of ring 151'' would be originally at 280. After wear and adjustment, however, it would move to some position 280'. The active tooth profiles of the clutch member 151 are then made up of the side surface 282 of tooth 271' and of the side surface 281'' of tooth 271''. The full line profile 282' is under load when the motor drives the car and the dotted profile 281'' is under load in coasting when the car drives the motor. In this way the active tooth becomes thicker and takes up undue backlash.

A stop is provided in the mechanism of the present invention to limit the axial displacement away from each other of the two clutch members 150 and 151. The purpose of this stop is to avoid undue helical displacement of the clutch teeth when the pressure on the friction discs is to be released by withdrawing roller 201. This stop ordinarily would have to be adjusted when ring 151'' is adjusted to take up wear. I preferably give the stop such a shape that it does not require adjustment, but will adjust itself automatically.

Figure 13:
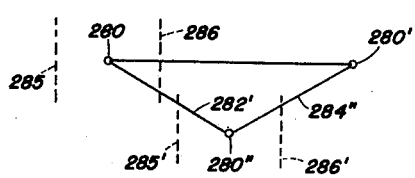

Fig. 13 explains the problem. Point 280 (Fig. 12) can be considered not only as a corner of a side of a tooth 271' of ring 151' but also as a corner of the mating tooth 270 of clutch member 150. After adjustment of ring 151'', point 280 of clutch member 150 has moved to position 280'' along the helix 282'. Fig. 13 is a large scale reproduction of the triangle 280—280'—280''. The new zero position 280' also lies on the helix 284'' through point 280'. The stop is to limit the axial adjustment of the clutch members or the equivalent peripheral movement of the clutch teeth. Thus the stop may limit the peripheral displacement of point 280 so that it is kept inside of the two dotted lines 285 and 286 (Fig. 13). The spacing of these lines is not drawn to scale. In the new position 280' the stop should permit adjustment of point 280'' within dotted lines 285' and 286' which are the same distance apart as the lines 285 and 286. This is accomplished by stops 272 which are mounted on the face of clutch member 150 and which cooperate with stops 287 and 288 mounted on the face of clutch member 151.

Figure 10:
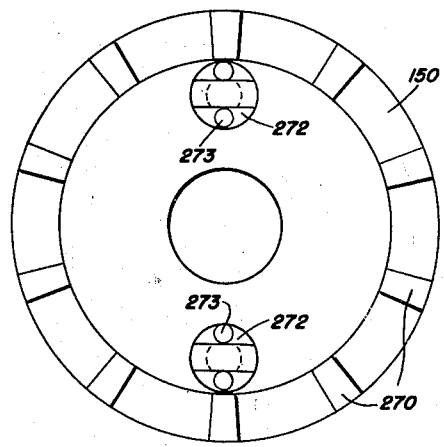
Fig. 10 is an end view of the mating helical clutch member and of the stops which it carries.
Figure 11:
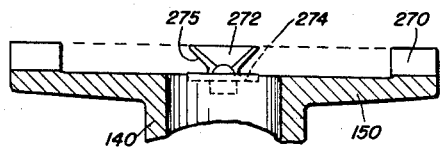
Fig. 11 is an axial sectional view of the helical clutch member of Fig. 10, the view being taken at right angles to the sectional view of Fig. 6.

The clutch member 150 is shown more particularly in Figs. 10 and 11. There are two diametrically opposite stops 272 secured in its front face radially within its teeth. These are fastened by rivets 273 in circular recesses 274 formed in the clutch member. These stops are formed by slabbing off inverted cones along planes parallel to the axis of clutch member 150. The working sides of each stop 272 extend, then, along a conical surface 275. The base of this conical surface is at the top of the stop so that the stop member is widest at its outer end. The cone angle $c$ of this surface is preferably made equal to the helix angle of the helical clutch teeth 270 extended to the radius of the cone axis. Thus, if $R''$ is the distance of the cone center from the axis of rotation of the clutch member 150, the cone angle $c$ is determined as follows:

$$\tan c = \frac{2\pi R''}{L}$$

Each stop 272 is adapted to engage a mating stop 287 on the forward side and a mating stop 288 on the opposite side. Stops 287 are diametrically opposite projections of inner ring 151'' of clutch member 151. Stops 288 are diametrically opposite projections from the enlarged end face of sleeve 145. These stops have internal conical surfaces 289 and 290, respectively, adapted to contact with the external conical surface 275 of stop 272. The cone angle of the internal conical surfaces is the same as the cone angle $c$ of the external conical surface 275. Stops 287 have fine pitch saw teeth 277' on their backs forming part of ring 151'' and adapted to cooperate with saw teeth 277 of sleeve 145.

Figure 14:
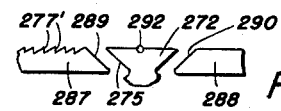
Figs. 14 and 15 are fragmentary developed views showing the relative positions of the stops before and after adjustment for wear.
Figure 15:
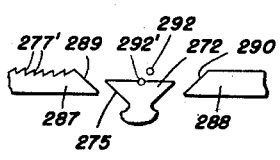

Figs. 14 and 15 illustrate the action of the stops. These diagrammatic views are taken looking downwardly toward the center of Fig. 9. Here forward motion means going to the left Fig. 14 shows the relative positions of the parts before adjustment of ring 151''. The stops permit equal displacement of ring 151'' to the right and to the left from a zero point 292. In the position shown in Fig. 15 the ring 151'' with its stop 272 has been adjusted in the direction of forward motion to take up backlash between the clutch teeth. The clutch member 150, of which stop 272 is a part, has been moved outwardly along the helix of the driving sides 282' of the teeth of the clutch members so that 292' is now the new zero position. Line 292—292' is part of a helix of the same lead as line 280—280'' (Fig. 13). With the cone angles determined as described, point 292' and stop 272 are equally distant from stops 287 and 288 and have the same distance therefrom as in the initial position of Fig. 14. It will be seen that the stop action has been transferred to the new zero position without separate adjustment of the stops 272 on the clutch member 150 or of mating stops 287 and 288 relative to clutch member 151.

As pointed out above, the position of the inner ring 151'' and its stop 272 is spring controlled, spring 278 keeping ring 151'' pressed against the mating fine pitch saw teeth 277 provided on clutch member 151. The pressure of the spring is sufficient to prevent excess axial displacement when the pressure roller 201 is axially withdrawn. It is designed, however, to yield at heavy loads. Such loads may occur at the stops after wear of the friction discs has taken place. Clutch member 150 with stops 272 then moves outwardly along the helical sides of the clutch teeth which are in driving contact and finally stops 272 hit stops 287. Stops 272 then lift ring 151'' from its seat on the saw teeth 277 against the moderate pressure of the spring 278 and push the ring ahead one tooth if the wear has been large enough to permit it. Thereby the adjustment for taking up wear is completed automatically. Such adjustment can be hastened, if desired, by suddenly slamming on the brakes of the automobile while leaving pressure roller 201 in its normal forward position.

The operation of the automotive transmission described will be understood from the preceding description but may be summed up briefly here.

Shaft 130 is coupled directly to the engine of the automotive vehicle. In forward drive, except at 1 to 1 ratio, shaft 130 drives shaft 131 through friction discs 137 and 138, clutch members 150 and 151, and friction discs 154 and 155. Clutch member 246 is then in forward position shown in Fig. 6 and shaft 131 then, drives shaft 238 through the engaging face clutch teeth of bevel gear 170 and clutch member 246. Shaft 238 is the propeller shaft of the vehicle and may be suitably connected to the drive wheels of the vehicle.

For different ratios, slide 149 is adjusted to move sleeves 140 and 145 toward or from shafts 130 and 131. During this movement the end friction discs of the sets 138 and 154 will move radially and axially, inwardly or outwardly relative to pressure rollers 200 and 201 to maintain frictional driving contact between the several sets of friction discs 137, 138, 154 and 155.

For direct drive, slide 149 is moved far enough away so that the portions 158 of friction discs 138 are in registry with the thinned down portions 157 of friction discs 137 and these two sets of discs are out of driving contact. As slide 149 is moved to this position, roller 189 of lever 187 will ride down on the slope of cam surface 190 of slide 149 and clutch 175 will be engaged to connect shafts 130 and 131 directly.

For reverse drive, clutch 246 will be shifted to engage bevel gear 231. Drive will then be from shaft 131 through bevel gears 170, 230 and 231 to propeller shaft 238.

When wear of the friction discs occurs, backlash between clutch members 150 and 151 will cause stops 272 to lift stops 287 off saw teeth 277 of sleeve 145; and ring member 151" will be shifted relative to ring member 151' to provide effectively wider clutch teeth on clutch member 151.

While the invention has been described in connection with particular embodiments and particular uses thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A friction drive comprising two shafts having parallel axes, a plurality of friction discs mounted on each shaft to rotate therewith but to be movable axially relative thereto, the discs of one shaft being adapted to engage between the adjacent faces of the discs of the other shaft, means for adjusting one shaft toward and from the other, and means for maintaining contact pressure between the discs in all positions of adjustment of said shaft comprising a member secured to one shaft to rotate therewith but to be movable axially relative thereto, said member having a surface of revolution on one end face, and a roller adapted to engage said end face.

2. A friction drive comprising two shafts having parallel axes, a plurality of friction discs mounted on each shaft to rotate therewith but to be movable axially relative thereto, the discs of one shaft being adapted to engage between the adjacent faces of the discs of the other shaft, means for adjusting one shaft toward and from the other, and means for maintaining contact pressure between the discs in all positions of adjustment of said shaft comprising a member secured to one shaft to rotate therewith but to be movable axially relative thereto, said member having a conical surface on one end face, a roller having a conical surface which engages the said conical end face of said member, and means for adjusting said roller relative to one shaft in a direction inclined to the axes of said shafts on adjustment of the one shaft toward or from the other.

3. A friction drive comprising two shafts having parallel axes, a plurality of friction discs mounted on each shaft to rotate therewith but to be movable axially relative thereto, the discs of one shaft being adapted to engage between the adjacent faces of the discs of the other shaft, means for adjusting one shaft toward and from the other, and means for maintaining contact pressure between the discs in all positions of adjustment of said shaft comprising a member secured to one shaft to rotate therewith but to be movable axially relative thereto, said member having a surface of revolution on one end face, a roller mounted to engage said surface at a point opposite the mean points of frictional contact of the discs, and means for effecting relative adjustment between the discs and the roller radially of the axis of the movable shaft on adjustment of said shaft.

4. A friction drive comprising two shafts having parallel axes, a plurality of friction discs mounted on each shaft to rotate therewith but to be movable axially relative thereto, the discs of one shaft being adapted to engage between the adjacent faces of the discs of the other shaft, means for adjusting one shaft toward and from the other, and means for simultaneously changing the axial distance between the mating discs to maintain driving contact between them comprising a pressure roller mounted on an axis lying in the plane of the axes of the shafts.

5. A friction drive comprising two shafts having parallel axes, a plurality of friction discs mounted on each shaft to rotate therewith but to be movable axially relative thereto, the discs of one shaft being adapted to engage between the adjacent faces of the discs of the other shaft, means for adjusting one shaft toward and from the other, and means for simultaneously changing the axial distance between the mating discs to maintain driving contact between them comprising a pressure roller mounted on an axis which is angularly disposed to but intersecting the axes of said shafts.

6. A friction drive comprising two shafts having parallel axes, a plurality of friction discs mounted on each shaft to rotate therewith but to be movable axially relative thereto, said discs having conical contact surfaces and the discs of one shaft being adapted to engage between the adjacent faces of the discs of the other shaft, means for adjusting one shaft toward and from the other, and means for simultaneously changing the axial distance between the discs to maintain frictional driving contact between them comprising a conical pressure roller mounted to rotate on an axis lying in the plane of the axes of the shafts and a member secured to one of said shafts to rotate therewith but to be movable axially relative thereto and having a conical surface with which the conical surface of said roller engages, said roller being mounted in fixed relationship to one of said shafts.

7. A friction drive comprising two shafts having parallel axes, a plurality of friction discs mounted on each shaft to rotate therewith but to be movable axially relative thereto, said discs having tapered contact surfaces and the discs of one shaft being adapted to engage between the adjacent faces of the discs of the other shaft, means for adjusting one shaft toward and from the other, and means for simultaneously changing the axial distance between the discs to maintain frictional driving contact between them comprising a pressure roller mounted to rotate on a fixed axis lying in the plane of the axes of the shafts, and a member mounted on the adjustable shaft to rotate therewith but to be movable axially relative thereto and having an internal conical surface with which the pressure roller engages.

8. A friction drive comprising a drive shaft and a driven shaft which are coaxial, a set of friction discs mounted on each of said shafts, two mating sets of friction discs mounted to rotate on an axis parallel to the axis of the drive and driven shafts and adapted to contact with the discs on said drive and driven shafts, respectively, and a torque loading coupling comprising a pair of mating face coupling members for operatively connecting the two mating sets of discs to produce axial pressure between them in proportion to the torque transmitted between the said two mating sets of discs, means for adjusting the axis of the two mating sets of discs radially toward and from the axis of the two shafts and means for maintaining said axial pressure in any adjusted position of the discs.

9. A friction drive comprising a drive shaft and a driven shaft which are coaxial, a set of friction discs mounted on each of said shafts, two mating sets of friction discs mounted to rotate on an axis parallel to the axis of the drive and driven shafts and adapted to contact with the discs on said drive and driven shafts, respectively, and a torque loading coupling comprising a pair of mating face coupling members for operatively connecting the two mating sets of discs to produce axial pressure between them in proportion to the torque transmitted between the said two mating sets of discs, means for adjusting the axis of the two mating sets of discs radially toward and from the axis of the two shafts and means for maintaining said axial pressure in any adjusted position of the discs comprising a pair of pressure rollers which are arranged to engage, respectively, the end members of the two mating sets of discs to change the axial distance between said end members upon said radial adjustment.

10. A friction drive comprising a pair of parallel shafts, a set of friction discs mounted on each of said shafts, the discs of one set alternating with the discs of the other set and each disc having conical operating surfaces at opposite sides which converge toward its periphery, one of said sets of friction discs having relatively long working profiles and the other set of friction discs having relatively short working profiles, and means for adjusting one shaft toward and from the other, the set of discs, which have long working profiles, being thinned down adjacent their peripheries on both sides to provide narrow lands adjacent their peripheries which will be out of contact with the discs of the other set on adjustment of the shafts a predetermined distance apart but which will serve to maintain the alternate relationship of the discs.

11. A friction drive comprising a drive shaft and a driven shaft which are coaxial, a pair of coaxial countershafts parallel to the drive and driven shafts, mating sets of friction discs mounted on the drive shaft and one of said countershafts, the discs of one shaft being interposed between the discs of the other shaft, other mating sets of friction discs mounted on the driven shaft and the other countershaft, the discs of one shaft being interposed between the discs of the other shaft, means for operatively connecting the countershafts, means for maintaining contact pressure between the mating sets of discs, means for adjusting one pair of coaxial shafts toward and from the other between maximum and minimum limits to vary the ratio of the drive, the maximum distance which the shafts can be adjusted apart being less than the sum of the outside radii of the mating discs, a clutch for connecting the drive shaft directly to the driven shaft, and means for releasing the contact pressure between the discs upon said connection.

12. A friction drive comprising a drive shaft and a driven shaft which are coaxial, a pair of coaxial countershafts parallel to the drive and driven shafts, mating sets of friction discs mounted on the drive shaft and one of said countershafts, other mating sets of friction discs mounted on the driven shaft and the other countershaft, one set of friction discs having their side surfaces relieved adjacent their peripheries to provide thinned down portions at their peripheries which do not contact with the mating discs, means for operatively connecting the countershafts, means for maintaining contact pressure between the mating sets of discs, means for adjusting one pair of coaxial shafts toward and from the other between maximum and minimum limits to vary the ratio of the drive, the maximum distance which the shafts can be adjusted apart being less than the sum of the outside radii of the mating discs, a clutch for connecting the drive shaft directly to the driven shaft, means for engaging said clutch automatically when the two pairs of shafts have been moved a predetermined distance apart, and means operable upon said movement for releasing the contact pressure between the discs.

13. A friction drive comprising a drive shaft and a driven shaft which are coaxial, a pair of coaxial countershafts parallel to the drive and driven shafts, mating sets of friction discs connected to the drive shaft and one of the countershafts, other mating sets of friction discs connected to the driven shaft and the other countershaft, means for adjusting one coaxial pair of shafts toward and from the other coaxial pair of shafts, means for axially shifting the discs on their respective shafts to maintain frictional contact between mating discs in different adjusted positions of the shafts, a helical toothed face coupling for connecting the two countershafts and adapted to create axial pressure between the discs in proportion to the torque transmitted through the coupling, and means for releasing said axial pressure.

14. A friction drive comprising a drive shaft and a driven shaft which are coaxial, a pair of coaxial countershafts parallel to the drive and driven shafts, mating sets of friction discs connected to the drive shaft and one of the countershafts, other mating sets of friction discs connected to the driven shaft and the other countershaft, means for adjusting one coaxial pair of shafts toward and from the other coaxial pair of shafts, means for axially shifting the discs on their respective shafts to maintain frictional contact between mating discs in different adjusted positions of the shafts, a helical toothed face coupling for connecting the two countershafts and adapted to create axial pressure between the discs in proportion to the torque transmitted through the coupling, a stop limiting the operation of the coupling, and means for releasing said axial pressure.

15. A friction drive comprising two coaxial sets of friction discs, a pair of toothed coupling members for operatively connecting the two sets of discs, and adjustable means for reducing the backlash between the teeth of the coupling members on wear of the friction discs.

16. A friction drive comprising two coaxial sets of friction discs, a pair of helical toothed face coupling members for operatively connecting the two sets of discs, and adjustable means for automatically reducing the backlash between the teeth of the coupling members on wear of the friction discs.

17. A friction drive comprising two coaxial sets of friction discs, and a pair of helical toothed face coupling members for operatively connecting the two sets of discs, one of said coupling members comprising two coaxial helically toothed parts which are rotatable relative to one another about the axis of said member to permit increasing the effective width of the teeth of said member thereby to permit reducing the backlash between the coupling members on wear of the discs.

18. A friction drive comprising two parallel shafts, sets of friction discs connected to the two shafts, respectively, to rotate therewith but to be movable axially relative thereto and adapted to mate with each other, means for adjusting one shaft toward and from the other to vary the ratio of the drive, and means for applying contact pressure between the two sets of discs at a point offset from the axes of the two shafts and in line with the points of contact of the discs and in the plane of the axes of the two shafts in any adjusted position of the adjacent shaft.

19. A friction drive comprising a drive shaft and a driven shaft which are coaxial, a set of friction discs, mounted on each shaft to rotate therewith but to be movable axially relative thereto, a pair of countershafts, two sets of friction discs mounted on the two countershafts respectively, to rotate therewith but to be movable axially relative thereto, said two last-named sets of discs being adapted to mate, respectively, with the discs on the drive and driven shafts, means for transmitting torque between said countershafts adapted to move the sets of discs axially to create axial pressure between all the discs in proportion to the transmitted torque, means for effecting relative adjustment of the countershafts radially toward and from the drive and driven shafts, and means for maintaining the desired axial pressure in all adjusted positions.

20. A friction drive comprising a drive shaft and a driven shaft which are coaxial, a set of of friction discs mounted on each shaft to rotate therewith but to be movable axially relative thereto, a pair of countershafts, two sets of friction discs mounted on the two countershafts respectively, to rotate therewith but to be movable axially relative thereto, said two last-named sets of discs being adapted to mate, respectively, with the discs on the drive and driven shafts, a pair of mating toothed coupling members for operatively connecting the two sets of discs on the countershafts and having teeth whose sides are inclined to their axis.

21. A friction drive comprising a drive shaft and a driven shaft which are coaxial, a set of friction discs mounted on each shaft to rotate therewith but to be movable axially relative thereto, a pair of countershafts, two sets of friction discs mounted on the two countershafts, respectively, to rotate therewith but to be movable axially relative thereto, said two last-named sets of discs being adapted to mate, respectively, with the discs on the drive and driven shafts, mating toothed face coupling members connecting said countershafts to transmit torque therebetween, said coupling members having helical side tooth surfaces, means for effecting relative adjustment of the countershafts radially toward and from the drive and driven shafts, and means for maintaining axial pressure between all said discs in any adjusted position.

22. A friction drive comprising two coaxial shafts, a set of friction discs secured to each shaft to rotate therewith but to be movable axially relative thereto, the number of discs in one set being less than that in the other set, the discs of the smaller set having substantially conical working surfaces of short profile length disposed adjacent the circumferences of the discs, the discs of the larger set having conical surfaces of long profile length, a torque loading coupling for transmitting torque between said shafts, mating sets of discs engaging said two sets of discs to transmit torque, means for changing the radial distance between the first-named sets of friction discs and their mating discs, and positive means for moving the discs axially upon changing said radial distance.

23. A friction drive comprising two coaxial shafts, a set of friction discs secured to each shaft to rotate therewith but to be movable axially relative thereto, the discs of the two sets being of the same diameter but the number of discs in one set being less than three-fourths of the number in the other set, the discs of the smaller set having substantially conical working surfaces of short profile length disposed adjacent the circumferences of the discs, the discs of the larger set having conical surfaces of long profile length, a pair of toothed face coupling members having tooth sides inclined to the direction of their axis for transmitting torque between said shafts, mating sets of discs engaging said two sets of discs to transmit torque, means for changing the radial distance between the interengaging discs, and positive means for moving the discs axially upon changing their radial distance.

24. A friction drive comprising a shaft rotatable on a relatively fixed axis, a plurality of tapered friction discs of relatively long working profile connected with said shaft, a shaft parallel to the first shaft, means for adjusting the latter shaft toward and from the first shaft, a plurality of friction discs of relatively short working profile connected with the second shaft and engaging the first-named friction discs, means comprising a support having guide-ways inclined to the axis of the second shaft, a member slidable on said ways for moving the discs axially toward one another on adjustment of the second shaft away from the first, and means actuated by the torque transmitted through the second shaft for creating axial pressure between the discs.

25. A friction drive comprising two shafts which have parallel axes, a plurality of tapered friction discs mounted on each shaft to rotate therewith and to be movable axially thereon, the discs of one shaft being adapted to engage between the adjacent faces of the discs of the other shaft, means for adjusting one shaft toward and from the other, means for shifting said discs axially upon adjustment of said one shaft to retain said discs in engagement, said last-named means comprising a member secured to the adjustable shaft to rotate therewith and to be movable axially thereon, a part bearing against said member, and means constraining said part to move in the plane of the axes of said two shafts in a straight path inclined to said axes upon adjustment of one shaft toward and from the other.

26. A friction drive comprising two shafts which have parallel axes, a plurality of friction discs mounted on each shaft to rotate therewith but to be movable axially relative thereto, the discs of one shaft being adapted to engage between the adjacent faces of the discs of the other shaft, means for adjusting one shaft toward and from the other, means for shifting said discs axially upon adjustment of said one shaft to retain said discs in engagement, said last-named means comprising a member secured to the adjustable shaft to rotate therewith but to be movable axially relative thereto, a roller adapted to engage said member, and a support on which said roller is journaled, said support being constrained to move in the plane of the axes of said two shafts in a straight path inclined to said axes upon adjustment of one shaft toward and from the other.

27. A friction drive comprising two shafts which have parallel axes, a plurality of friction discs mounted on each shaft to rotate therewith but to be movable axially relative thereto, the discs of one shaft being adapted to engage between the adjacent faces of the discs of the other shaft, means for adjusting one shaft toward and from the other, means for shifting said discs axially upon adjustment of said one shaft to retain said discs in engagement, said last-named means comprising a member secured to the adjustable shaft to rotate therewith but to be movable axially relative thereto, a roller adapted to engage said member, and a support on which said roller is journaled, said support being constrained to move in the plane of the axes of said two shafts in a straight path inclined to said axes upon adjustment of one shaft toward and from the other, the axes of said roller being angularly disposed to and intersecting the axes of the two shafts.

28. A friction drive comprising two shafts having parallel axes, a plurality of friction discs mounted on each shaft to rotate therewith but to be movable axially relative thereto, the discs of one shaft being adapted to engage between the adjacent faces of the discs of the other shaft, means for adjusting one shaft toward and from the other, means for shifting said discs axially upon adjustment of said one shaft to retain said discs in engagement, the last-named means comprising a member secured to the adjustable shaft to rotate therewith but to be movable axially relative thereto, and a roller having a conical bearing surface adapted to engage said member, a support on which said roller is journaled, and a pair of inclined guide-ways disposed on opposite sides of the plane of said two shafts on which said support is adapted to slide in said plane at an angle to the axes of said shafts upon movement of said one shaft toward and from the other.

29. An adjustable friction drive comprising a drive shaft, a driven shaft coaxial therewith, a pair of coaxial countershafts parallel to the drive and driven shafts, interengaging tapered friction discs for connecting the drive shaft with one countershaft, interengaging tapered friction discs for connecting the other countershaft with the driven shaft, a clutch for connecting the drive and driven shafts directly, means for connecting the two countershafts and exerting pressure between the several discs comprising a torque-loading coupling, a stop for limiting axial displacement away from each other of the two members of said coupling, and a roller bearing against an end disc of one set of discs, and means for simultaneously releasing said clutch and withdrawing said roller from its bearing position.

30. A friction drive comprising two shafts having parallel axes, a plurality of tapered friction discs mounted on each shaft to rotate therewith and to be movable axially relative thereto, the discs of one shaft being adapted to engage between the adjacent faces of the discs of the other shaft, means for adjusting one shaft toward and from the other, means for shifting said discs axially upon adjustment of said one shaft to retain said discs in engagement, said last-named means comprising a part held in radial alignment with said one shaft, and a support for said part having an inclined straight guideway on which said part is movable and which constrains said part to move in the plane of said parallel axes along a straight line inclined at an acute angle to said axes.

31. A friction disc for use in adjustable friction drives in which the drive and driven shaft may be directly connected by a direct drive clutch, said disc having conical working surfaces at its opposite sides of a profile length equal to at least half the outside radius of the disc, and having its opposite sides relieved adjacent the periphery of the disc, the relieved portions of opposite sides of the disc being closer together than the working portions of said opposite sides.

ERNEST WILDHABER.

REFERENCES CITED

The following references are of record in the file of this patent:

UNITED STATES PATENTS

| Number | Name | Date |
| --- | --- | --- |
| 1,017,877 | Landis | Feb. 20, 1912 |
| 1,843,426 | Lee | Feb. 2, 1932 |
| 1,995,689 | Shively | Mar. 26, 1935 |
| 2,445,066 | Hayes | July 13, 1948 |

FOREIGN PATENTS

| Number | Country | Date |
| --- | --- | --- |
| 27,301 | Great Britain | Oct. 29, 1914 |